Feb. 3. 1925.                                                                    1,525,426
P. MUELLER ET AL
PRESSURE REGULATOR
Filed Dec. 14, 1922
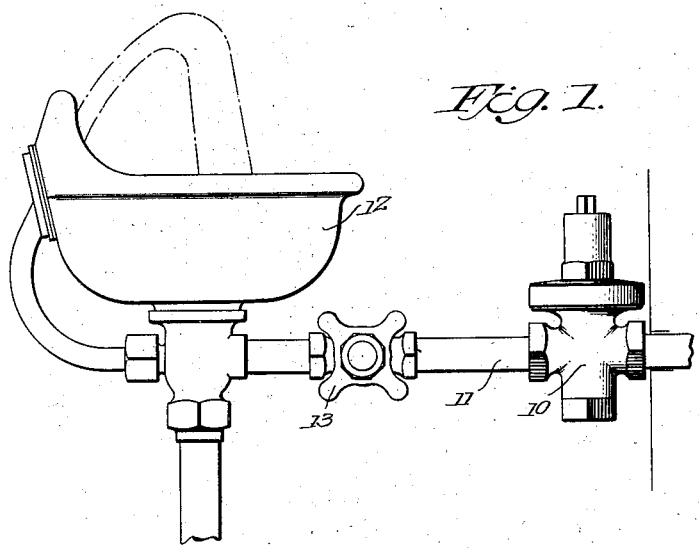
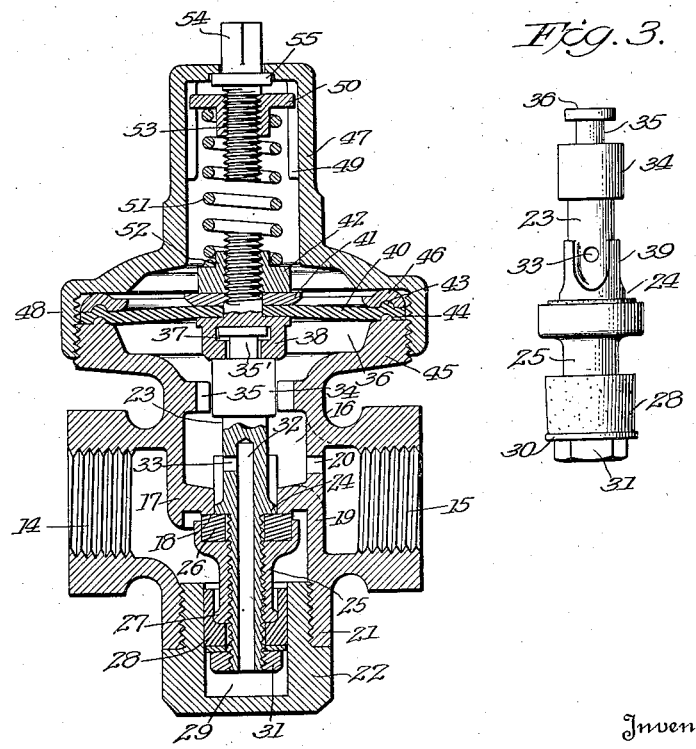
Inventor
Philip Mueller.
Anton C. Schuermann.
By Cushman, Bryant & Darby
Attorneys Patented Feb. 3, 1925.

1,525,426

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

PRESSURE REGULATOR.

Application filed December 14, 1922. Serial No. 606,882.

*To all whom it may concern:*

Be it known that PHILIP MUELLER and ANTON C. SCHUERMANN, citizens of the United States, residing at Decatur, in the county of Macon and State of Illinois, have invented new and useful Improvements in Pressure Regulators, of which the following is a specification.

This invention relates to fluid pressure regulators for reducing and controlling the pressure of fluids, and more particularly to a construction in which means automatically controlled by the pressure in the regulator is connected to a valve stem having a communicating passage therein, for equalizing or balancing the pressure that actuates the valve.

One of the essential features of this invention resides in providing a communicating port between the intermediate chamber and outlet, which is of less area than the opening between the inlet and intermediate chamber, in order that a responsive and sensitive means may be utilized to compensate for any sudden variation in the delivery pressure, and accurately maintain the outlet flow uniform and constant.

While the ordinary type of pressure regulator is suitable for delivering pressure to outlets positioned in a horizontal or vertical plane, they have been found deficient in supplying water to a drinking fountain in which the nozzle is positioned on an incline, since they are not sufficiently sensitive to properly regulate the supply when so angularly positioned.

In order to overcome the inherent defects prevalent in the common form of pressure regulators when the supply has to be delivered to an inclined outlet, we have devised an installation for so regulating the pressure of water delivered to a drinking fountain of this type, which positively insures a uniform and constant delivery to the outlet, and which is adapted to automatically compensate for any sudden variation in the initial pressure, thus precluding the possibility of the flow spurting over the edge of the bowl when the pressure suddenly increases, and equally maintaining a sufficient supply when the pressure falls below the point to which the stream has been adjusted.

Referring to the drawings wherein is disclosed a preferred embodiment of the invention,—

Figure 1 is a diagrammatic view showing the invention connected with an inclined stream drinking fountain.

Figure 2 is a vertical sectional view of the regulator.

Figure 3 is a detail view of the valve stem and its associated parts.

Referring to the accompanying drawings wherein like numerals indicate like parts in the various figures, and more particularly to Figure 1, 10 denotes the body of a fluid pressure regulator which is connected by the outlet pipe 11 to an inclined nozzle in the drinking fountain 12. A stop cock 13 is positioned on the pipe 11 for connecting and disconnecting the supply to the fountain 12.

The regulator 10 is provided with the inlet 14, an outlet 15, and a low pressure chamber 16, which are separated from each other by the partition 17 having a centrally disposed opening that forms a valve seat 18, on the lower surface of the partition 17.

The outlet 15 is separated from the chamber 16 by the partition 19 which is provided with a port or opening 20 for establishing a direct communication between these parts. In order that the accurate function of the pressure regulator may be effected, the port 20 is of much smaller diameter than the valve opening 18 positioned between the inlet 14 and chamber 16. By reason of the particular size of the port 20, it is practically impossible for the low pressure in the chamber 16 to fall suddenly, since the restricted opening of the port 20 prevents the water from quickly passing to the outlet 15, and thus the possibility of seriously reducing the pressure in the chamber 16 is precluded. Should, on the other hand, the high pressure in the inlet 14 increase, as it quite often does from various causes, the pressure maintained in the chamber 16 will immediately respond to close the port 18. Depending from the bottom of the regulator there is provided a cylindrical extension 21 which is internally threaded so as to engage the correspondingly exterior threads on the recessed plug 22.

A valve stem 23 extends through the opening 18 in the partition 17 and is provided intermediate its ends with an annular flange 24, which closely fits the opening 18 and serves as a preliminary valve to throttle the flow before the main valve seat is opened so as to prevent water hammering of the parts.

The lower portion of the stem below the collar 24 is of smaller diameter than the collar and is exteriorly threaded so as to engage the sleeve 25. This sleeve has an enlarged upper end provided with a recess for receiving a flexible seat washer 26, that is adapted to be brought into contact with the valve seat 18 for maintaining the valve in the closed position.

The lower extremity of the sleeve 25 terminates in a flange 27, which receives the flexible cup piston 28 housed in the cylinder 29 formed in the plug 22. The piston 28 is open at its upper end so as to form a space between its inner wall and the adjacent wall of the sleeve, while its opposite end engages the lower portion of the stem 23 and is clamped to the flange 27 preferably by the washer 30 and the nut 31. The cup portion of the piston 28 is arranged to be in communication with the inlet 14 so that the initial or inlet pressure will tend to expand the wall of the piston radially, thus keeping it in tight contact with the wall of the cylinder 28, and at the same time forcing the piston downward to move the washer 26 away from the valve seat 18.

In order to provide a communicating passage between the chamber 16 and the cylinder 29, the stem 23 is formed with a vertical duct 32 which is connected to the chamber 16 by the lateral duct 33, so as to uniformly distribute the pressure on both sides of the valve.

The piston 28 is slightly smaller in diameter than the valve seat 18 in order to allow a preponderance of the inlet pressure against the under side of the valve washer 25, which will tend to close the valve. While the effective force of the inlet pressure against the valve washer 25 and the piston 27 will not be uniform, the construction of the regulator is such that the force of the delivery or back pressure against the respective opposite sides of the washer 26 and the piston 27 is practically equal. It will be further noted that the diameter of the valve seat opening is slightly less than that of the piston 27 so as to permit the frictional engagement of the piston with the walls of the cylinder.

The upper end of the valve stem 23 is provided with an enlarged shoulder 34, which is in slidable contact with the inwardly projecting guide lugs 35 formed integral with the chamber 16. Attached to the shoulder 34 is a reduced extension 35' having an enlarged head 36 adapted to loosely fit in a T-shaped slot 37 formed in the head of the threaded bolt 38.

The stem 23 is further provided with a plurality of radially extending ribs 39, which project upwardly a short distance above the flange 24 and serve as guides for the stem through the opening 18, and also provides a fluid passageway from the inlet 14 to the low pressure chamber 16.

A flexible diaphragm 40 is preferably clamped between a reduced portion of the bolt 38 and a friction washer 41 by the nut 42 as shown. The outer marginal edge of the diaphragm 40 is provided with an annular rib 43, which is interposed between the annular projection or rib 44 formed in the outer surfaces of the enlarged flange 45 on the body 10 and a metal washer 46, so as to secure a non-slip joint between the assembled parts.

A closure cap 47 is provided with an enlarged end flange 48 which is threadedly secured to the flange 45 as shown.

The closure cap 47 has arranged interiorly thereof a pair of diametrically opposed ribs 49 which engage recesses formed in the pressure button 50 so as to maintain the latter against rotation. Interposed between the button 50 and the nut 42 is the compression spring 51 which is maintained in concentric position with respect to the bolt 38 by the reduced extension 52 and the nut 42.

Extending through an opening in the top of the cap 47 is an adjusting screw 53 which is in threaded engagement with the button 50 and is provided at its lower end with a polygonal tool engaging head 54. The outward movement of the screw 53 is limited by the annular collar 55 that is adapted to engage the inner wall of the cap 47.

It will be apparent that by reason of the particular arrangement of the adjusting screw 53, that all necessary adjustments of the delivery pressure may be made without moving the screw in a lengthwise direction, thus enabling the use of a close fitting and removable housing for the regulator.

The present construction differs materially from the ordinary type of pressure regulator, since in the latter the upper end of the by-pass is adapted to open into the outlet chamber, while in the present development in which the small outlet port 20 is employed, it is necessary that the upper end of the by-passage 42 open into the low pressure chamber 16 so that the pressure in the outlet chamber when the stop cock 13 is open will be much less than the pressure in the chamber 16. As the pressure in the chamber 16 acts against the under side of the valve seat 26, it is essential that this same pressure be exerted against the lower end of the piston 28 in order that the force of the low pressure against each side of the valve seat 18 will be equalized.

It will be seen that by reason of the present construction a very simple and inexpensive regulator is provided in which the various parts may be very expeditiously assembled or disassembled and new elements applied for those which had become worn out through usage. In order to dismantle the regulator it is merely necessary to remove the closure cap 47 from the flange 45 and disengage the diaphragm from its loose connection with the bolt 38. The plug 22 is then disengaged from the lower portion of the body, thus permitting the valve stem and its associated parts to be removed. The sleeve 25 and the piston 28 are disengaged from the stem 23 immediately upon removal of the nut 31, while the diaphragm 40 is unscrewed from engagement with the stem of the nut 38.

The operation of the device is as follows: Assuming that the adjusting screw 53, previously described has been turned to the right until the pressure button 50 is in a position in which the spring is distended and no pressure is exerted upon the diaphragm 40, and the valve washer 26 is away from its seat, a small quantity of water will be conducted from the inlet 14 through the opening 18 into the low pressure chamber 16 where it will be delivered out through the ducts 33 and 32 into the cylinder 29 back of the flexible piston 28, the air in the cylinder 29 being forced through the ducts 32 and 33 in the chamber 16. When the chamber 16 and the cylinder 29 become filled with water the pressure will force the diaphragm 40 upward, thus drawing the seat washer 26 into contact with the valve seat 18 and closing the valve. The adjusting screw 53 by means of a wrench or other suitable tool will then be turned to the left, causing the button 50 to move downwardly thereby exerting pressure on the diaphragm 40 through the tensioning of the spring 51. The downward pressure exerted by the spring 51 tends to overcome the upward pressure exerted by the diaphragm, thus forcing the valve washer 26 away from its seat so as to permit the entrance of water into the chamber 16.

At this point the stop cock 13 shown in Figure 1 may be open so as to see if the drinking stream of the fountain 12 is of sufficient pressure. If the stream is still too weak the screw 53 will be further turned to the left so as to increase the pressure on the diaphragm, which mechanical pressure tends to overcome the resistance of the hydraulic pressure acting against the under side of the diaphragm. When the desired pressure has been obtained the valve washer 26 will be automatically forced to its seat each time the delivery or back pressure from the inlet 14 exceeds in the slightest degree the point at which the drinking stream was found to be satisfactory. Thus, it will be seen that the supply will be maintained in a uniform flow irrespective of the fluctuations in the inlet or initial pressure.

While the form of the invention herewith shown and described is shown in connection with a drinking fountain, it is to be understood that it may be used with other installations in which a close regulation of fluid pressure is required, and that such minor changes in construction and arrangement of parts that fall within the purview of the appended claims may be made without departing from the spirit of this invention.

We claim:
1. A regulator having an inlet, a port connecting said inlet with a chamber, a valve for said port, pressure controlled means to actuate said valve, an outlet from said chamber of less area than the inlet, and means for balancing the valve including a passage extending through the body thereof.

2. A regulator having an inlet, a port connecting said inlet with a chamber, an outlet from said chamber of less area than the inlet, a valve for said port, and pressure controlled means to actuate the valve, the stem of the valve being tubular and serving to conduct pressure from said chamber to the opposite side of the valve to balance it.

3. A regulator having an inlet, a port connecting said inlet with a chamber, a valve for said port, pressure controlled means in said chamber to actuate the valve, an outlet from said chamber of less area than the inlet, a piston connected to the valve on the opposite side thereof from said pressure controlled means, and means for conducting pressure from the chamber to the face of the piston remote from the valve including a passage through the valve body.

4. A regulator having an inlet, a port connecting said inlet with a chamber, a valve for said port, a spring pressed diaphragm in said chamber and connected with the valve, an outlet from said chamber of less area than the inlet, a piston connected with the valve on the opposite side thereof from said diaphragm, and means for conducting pressure from the chamber to the face of the piston remote from the valve including a passage through the valve body.

5. A regulator having an inlet, a port connecting said inlet with a chamber, a valve stem traversing said port, a valve for controlling the flow through said port secured to the intermediate portion of said stem, pressure controlled means detachably secured to one end of said stem for actuating said valve, a piston connected to the other end of said stem, and a passage in said stem extending from said chamber to said piston.

6. A regulator having an inlet, a port connecting said inlet with a chamber, a valve stem traversing said port, a valve for controlling the flow through said port removably secured to the intermediate portion of said stem, pressure controlled means detachably secured to one end of said stem for actuating said valve, a piston connected to the other end of said stem, a passage in said stem extending from said chamber to said piston, and an outlet in said chamber of less area than said inlet.

7. A regulator having an inlet, a port connecting said inlet with a chamber, a cylinder beneath said chamber, a valve stem traversing said port, a valve for controlling the flow through said port secured to the intermediate portion of said stem, pressure controlled means in said chamber detachably connected to one end of said stem, a piston in said cylinder attached to the opposite end of said stem, and an outlet from said chamber of less area than said inlet.

8. A regulator having an inlet, a port connecting said inlet with a chamber, a cylinder beneath said chamber, a valve stem traversing said port, a valve for controlling the flow through said port secured to the intermediate portion of said stem, pressure controlled means in said chamber detachably connected to one end of said stem, a piston in said cylinder attached to the opposite end of said stem, a passage in said stem extending from said chamber to said cylinder, and an outlet from said chamber of less area than said inlet.

9. A regulator having an inlet, a port connecting said inlet with a chamber, a cylinder removably secured to said regulator, a valve stem traversing said port, a valve for controlling the flow through said port connected to the intermediate portion of said stem, pressure controlled means detachably secured to one end of said stem, a piston in said cylinder attached to the opposite end of said stem, a passage in said chamber extending from said chamber to said cylinder, an outlet from said chamber of less area than said inlet, and means in said chamber for adjusting the pressure on said pressure controlled means.

10. A pressure regulator comprising a body having an inlet, an outlet, and an intermediate chamber, a port connecting said inlet with said chamber, a cylinder detachably connected to said body, a valve stem traversing said port, a valve for said port connected to the intermediate portion of said stem, a cap removably secured to said chamber, a yieldable diaphragm connected to one end of said stem, and a piston to the other end thereof, a passage in said stem extending from said chamber to said cylinder, an opening connecting said outlet with said chamber, said opening being of less area than said port, and compression means in said cap engaging said diaphragm.

11. A pressure regulator comprising a body having an inlet, an outlet, and an intermediate chamber, a port connecting said inlet with said chamber, a cylinder detachably connected to said body, a valve stem traversing said port, a valve for said port connected to the intermediate portion of said stem, a cap removably secured to said chamber, a yieldable diaphragm connected to one end of said stem, and a cup piston to the other end thereof, a passage in said stem extending from said chamber to said cylinder, an opening connecting said outlet with said chamber, said opening being of less area than said port, a pressure button in said cap, a spring interposed between said button and diaphragm, and an adjusting screw engaging said button and projecting through an opening in said cap.

12. A pressure regulator comprising a body having an inlet, an outlet, and an intermediate chamber, a port connecting said inlet with said chamber, a cylinder detachably connected to said body, a valve for said port connected to the intermediate portion of said stem, a cap removably secured to said chamber, a yieldable diaphragm connected to one end of said stem, and a piston to the other end thereof, a passage in said stem extending from said chamber to said cylinder, an opening connecting said outlet with said chamber, said opening being of less area than said port, a pressure button, guides in said cap for said button, a coil spring interposed between said diaphragm and button, and an adjusting screw engaging said button and projecting through an opening in said cap.

13. A pressure regulator comprising a body having an inlet, an outlet, and an intermediate chamber, a port connecting said inlet with said chamber, a cylinder detachably connected to said body, a valve stem traversing said body, a valve for said port connected to the intermediate portion of said stem, a flexible diaphragm in said chamber removably secured to one end of said stem, a piston in said cylinder connected to the opposite end of the stem, means in said chamber for guiding said stem, a passage in said stem extending from said chamber to said cylinder, an opening connecting said outlet with said chamber of less area than said port, a cap detachably connected to said chamber, a washer between said cap and diaphragm provided with means for non-rotatably securing the latter to the body, and means in said cap for adjusting the pressure on said diaphragm.

In testimony whereof we have hereunto set our hands.

PHILIP MUELLER.
ANTON C. SCHUERMANN.